United States Patent
Nagayasu

(10) Patent No.: US 7,283,293 B2
(45) Date of Patent: Oct. 16, 2007

(54) HIGH EFFICIENCY OPTICAL AMPLIFYING FIBER

(75) Inventor: Doukei Nagayasu, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 10/553,227

(22) PCT Filed: Mar. 30, 2005

(86) PCT No.: PCT/JP2005/006080

§ 371 (c)(1),
(2), (4) Date: Oct. 14, 2005

(87) PCT Pub. No.: WO2005/096460

PCT Pub. Date: Oct. 13, 2005

(65) Prior Publication Data

US 2006/0245704 A1    Nov. 2, 2006

(30) Foreign Application Priority Data

Apr. 2, 2004    (JP) ............... 2004-109791

(51) Int. Cl.
*H01S 3/00* (2006.01)
(52) U.S. Cl. ................................... 359/341.1
(58) Field of Classification Search .............. 359/341.1
See application file for complete search history.

(56) References Cited

U.S. PATENT DOCUMENTS

| | | | |
|---|---|---|---|
| 4,546,476 A | 10/1985 | Shaw et al. | |
| 4,938,561 A | 7/1990 | Grasso et al. | |
| 5,533,163 A | 7/1996 | Muendel | |
| 5,627,921 A * | 5/1997 | Lidgard et al. ............ 385/12 |
| 5,864,645 A | 1/1999 | Zellmer et al. | |
| 6,335,822 B1 * | 1/2002 | Toyohara ............... 359/341.1 |
| 6,480,659 B1 * | 11/2002 | Patlakh et al. ............. 385/125 |
| 6,625,363 B2 * | 9/2003 | Carter et al. .............. 385/127 |
| 6,687,445 B2 * | 2/2004 | Carter et al. .............. 385/127 |
| 6,724,528 B2 * | 4/2004 | Koplow et al. .......... 359/341.1 |
| 6,779,364 B2 * | 8/2004 | Tankala et al. ............ 65/390 |
| 6,825,974 B2 * | 11/2004 | Kliner et al. ............ 359/341.1 |
| 6,836,607 B2 * | 12/2004 | Dejneka et al. ............ 385/126 |
| 6,879,435 B2 * | 4/2005 | Rice ..................... 359/341.1 |
| 6,950,586 B2 * | 9/2005 | Po ......................... 385/127 |
| 6,959,022 B2 * | 10/2005 | Sandrock et al. ............ 372/6 |
| 6,997,636 B2 | 2/2006 | Tremouilhar | |

(Continued)

FOREIGN PATENT DOCUMENTS

EP    0 893 862 A2    1/1999

(Continued)

*Primary Examiner*—Deandra M Hughes
(74) *Attorney, Agent, or Firm*—McDermott Will & Emery LLP

(57) ABSTRACT

A small size and high efficiency laser oscillation apparatus capable of obtaining high output and high beam quality laser light is provided. First waveguide (21) (refractive index=n1) for transmitting excitation light, second waveguide (22) composed of core (23) (refractive index=n3) for generating laser light and clad (24) (refractive index=n2) for transmitting the excitation light, and third waveguide (25) (refractive index=n4) including first waveguide 21 and second waveguide 22 are provided. Light amplifying fiber (20), in which the refractive indices are set so as to satisfy the relation: n1<n4<n2<n3, is used and excised by semiconductor lasers (10a) and (10b).

29 Claims, 8 Drawing Sheets

U.S. PATENT DOCUMENTS

| | | |
|---|---|---|
| 7,003,206 B2 * | 2/2006 | Tankala et al. ............. 385/127 |
| 7,064,889 B2 * | 6/2006 | Digonnet et al. ........ 359/341.1 |
| 7,068,900 B2 * | 6/2006 | Croteau et al. ............. 385/126 |
| 2002/0037134 A1 | 3/2002 | Akamatsu et al. |
| 2003/0152349 A1 * | 8/2003 | Lauzon et al. .............. 385/126 |
| 2005/0254764 A1 * | 11/2005 | Chatigny .................... 385/123 |

FOREIGN PATENT DOCUMENTS

| | | |
|---|---|---|
| JP | 10-503885 | 4/1998 |
| JP | 10-125988 | 5/1998 |
| JP | 10-510104 | 9/1998 |
| JP | 11-026843 | 1/1999 |
| JP | 2001-010838 | 1/2001 |
| JP | 2001-68766 A | 3/2001 |
| JP | 2002-111101 | 4/2002 |
| JP | 2003-347630 | 12/2003 |
| WO | WO 96/04700 | 2/1996 |
| WO | WO 97/12429 | 4/1997 |

* cited by examiner

HIGH EFFICIENCY OPTICAL AMPLIFYING FIBER

This application is the U.S. National Phase under 35 U.S.C. § 371 of International Application No. PCT/JP2005/006080, filed Mar. 30, 2005, which in turn claims the benefit of Japanese Application No. 2004-109791, filed Apr. 2, 2004, the disclosures of which Applications are incorporated by reference herein in their entirety.

TECHNICAL FIELD

The present invention relates to a light amplifying fiber containing a laser medium, and a light amplifying method, a laser oscillation method, a laser amplifying apparatus and a laser oscillation apparatus using the light amplifying fiber, as well as a laser apparatus and a laser processing machine using the laser oscillation apparatus. In particular, it relates to an achievement of small size and high efficiency thereof.

BACKGROUND ART

Recently, in the field of material processing, laser processing has been generally spread widely as one of the processing techniques. For example, it has been recognized that laser welding and laser cutting provide higher processing quality as compared with other techniques. Market demands further high quality and high speed processing and also demands a laser oscillation apparatus and a laser amplifying apparatus which generates and emits a single mode laser light having a high output property, high efficiency, and a high light-collecting property, that is, having good beam quality (high beam quality).

In a conventional laser oscillation apparatus, a fiber in which a laser medium is added for realizing high output and a fiber for transmitting excitation light are disposed in adjacent to each other, and between the fibers, a material having a predetermined refractive index is filled. Such a conventional technology is described in, for example, Japanese Patent Unexamined Application No. 59-114883 and U.S. Patent Application Publication No. 4938561.

FIG. 8A shows a conventional laser oscillation apparatus. Laser oscillation apparatus 100 includes excitation light amplifying fiber 101 for transmitting excitation light, laser light amplifying fiber 102 containing a laser medium and coupling chamber 103. Excitation light amplifying fiber 101 and laser light amplifying fiber 102 are disposed in adjacent to each other. Coupling chamber 103 includes excitation light amplifying fiber 101 and laser light amplifying fiber 102 and is filled with a material having a predetermined refractive index.

FIG. 8B is a sectional view taken along line 8B-8B of FIG. 8A.

On both ends of laser light amplifying fiber 102, a final-stage mirror (not shown) for reflecting laser light and an output mirror (not shown) for taking out a part of laser light and reflecting the rest of the laser light are disposed. By the effect of these mirrors, laser light undergoes multiple feedback amplification.

Then, the operation of laser oscillation apparatus 100 is described. Excitation light propagating in excitation light amplifying fiber 101 enters laser light amplifying fiber 102 to excite the laser medium in coupling chamber 103. With the excitation and multiple feedback amplification, laser light is generated and emitted.

However, when high output is intended to be obtained in conventional laser oscillation apparatus 100, an excitation source is a high-output semiconductor laser, and the diameter of the excitation light amplifying fiber 101 is increased to be as large as about 100 μm. Therefore, for achieving high output, in order to allow the excitation light to enter the laser medium efficiently, the diameter of laser light amplifying fiber 102 is desirably equal to or larger than the diameter of excitation light amplifying fiber 101. However, in such a case, the beam quality is deteriorated.

On the other hand, to obtain laser light having good beam quality (high beam quality laser light), the diameter of laser light amplifying fiber 102 must be small. In general, in a case of near infrared laser light used for laser processing, for obtaining a high quality single mode laser light having good beam quality, the diameter of the laser light amplifying fiber must be about 6 μm to about 10 μm. Therefore, a conventional laser oscillation apparatus has a problem that high output and high beam quality laser light cannot be obtained.

The present invention provides a light amplifying fiber and a light amplifying method capable of obtaining high output and high beam quality laser light and realizing a small size and high efficiency.

SUMMARY OF THE INVENTION

The laser oscillation apparatus of the present invention includes a first waveguide for transmitting excitation light; a second waveguide composed of a core containing a laser medium and generating laser light and a clad for transmitting the excitation light; and third waveguide including the first waveguide and the second waveguide. The refractive indices of the first waveguide, the clad of the second waveguide, the core of the second waveguide and the third waveguide respectively denoted by n1, n2, n3 and n4 satisfy a relation: $n1<n4<n2<n3$. Such a configuration can optimize the combination of a light amplifying fiber, an excitation source and a feedback means. Consequently, it is possible to provide a laser apparatus for allowing the excitation light to enter a small-diameter excitation medium efficiently and emitting high-output and high beam quality laser light efficiently.

Figure 1A:
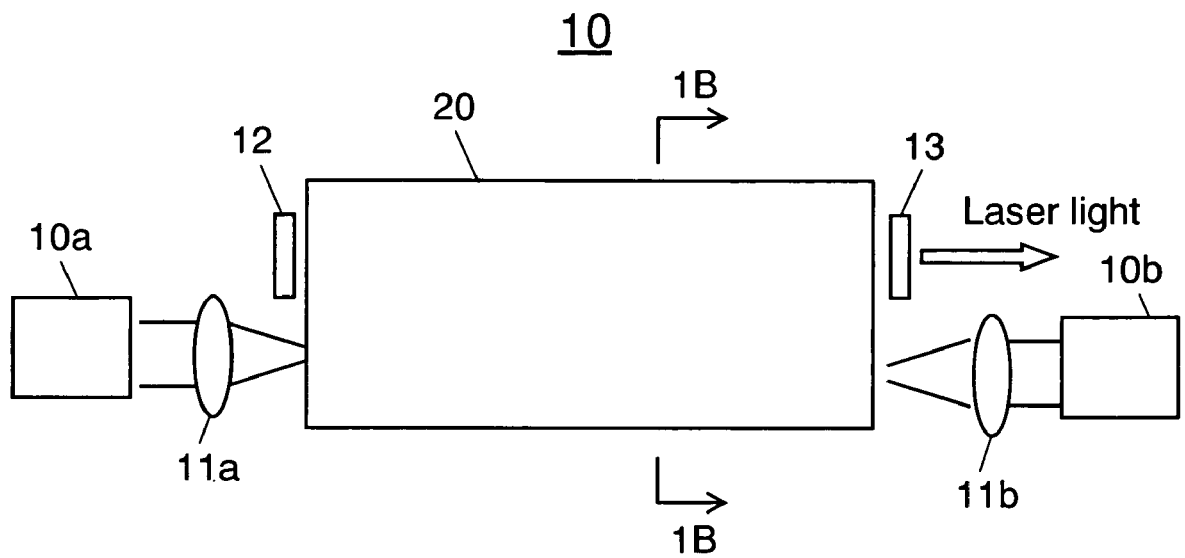
FIG. 1A illustrates a laser oscillation method and a laser oscillation apparatus using a light amplifying fiber in accordance with a first exemplary embodiment of the present invention.

REFERENCE MARKS IN THE DRAWINGS 10a, 10b semiconductor laser
11, 11a, 11b lens
12 final-stage mirror
13 output mirror
14, 15, 15b, 15c semiconductor laser
16, 16b, 16c fiber
21, 31, 71 first waveguide
22, 32, 62, 72 second waveguide
23, 33, 63, 73 core
24, 34, 64, 74 clad
25, 27, 35, 45, 65, 75 third waveguide
28, 28b, 28c, 30, 40, 60, 70 light amplifying fiber
51 laser oscillation apparatus
52, 53 laser amplifying apparatus
77a, 77b, 77c excitation light transmitting fiber
77d, 77e, 77f excitation light transmitting fiber core
78 high-reflection FBG
79 transmission FBG
81a, 81b, 81c idle region
82a, 82b filling region

DETAILED DESCRIPTION OF THE PREFERRED EMBODIMENTS

First Exemplary Embodiment

Figure 1B:
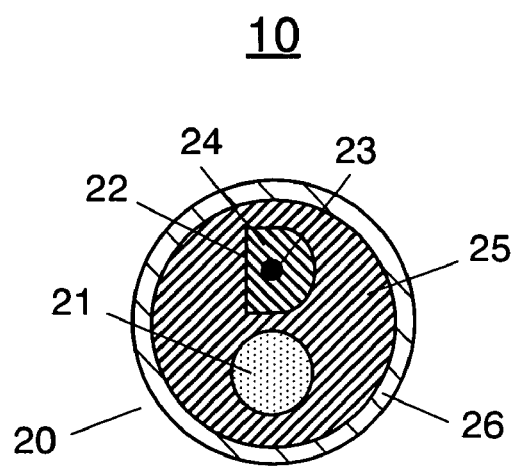
FIG. 1B is a sectional view taken a along line 1B-1B of FIG. 1A.

FIG. 1A illustrates a laser oscillation method and a laser oscillation apparatus using a light amplifying fiber in accordance with a first exemplary embodiment of the present invention. FIG. 1B is a sectional view taken along line 1B-1B of FIG. 1A.

FIG. 1A shows semiconductor lasers 10a and 10b that are excitation sources for generating excitation light, and also shows lenses 11a and 11b that are optical elements for guiding excitation light to an excitation light waveguide. Light amplifying fiber 20 includes a laser medium in a part thereof and has a cross-sectional shape being the same in the direction in which a laser is emitted, that is, in the direction of an optical axis. On both ends of laser light amplifying fiber 20, final-stage mirror 12 for reflecting laser light and output mirror 13 are disposed. Output mirror 13 takes out a part of laser light and reflects the rest of the laser light.

FIG. 1B is a sectional view taken along line 1B-1B of FIG. 1A. A material of light amplifying fiber 20 is glass that transmits excitation light. Light amplifying fiber 20 has a diameter of about 125 μm and has first waveguide 21 that is an excitation light waveguide. Furthermore, light amplifying fiber 20 includes second waveguide 22 having a D-letter shape which absorbs excitation light and generates laser light, third waveguide 25 which contains silicon as a main component, confines excitation light and has a function as a refractive index matching material, and outer layer 26 made of glass in which refractive index matching material is filled so as to enhance the confining efficiency of the excitation light. The full length of light amplifying fiber 20 is determined depending upon the absorption coefficient of laser light defined by the concentration of a laser medium added to core 23, etc., and a cross-sectional shape of second waveguide 22, and the like. The full length is usually about 20 meters.

Furthermore, second waveguide 22 includes core 23 having a diameter of 6 μm, containing a rare earth element, neodymium, that is a laser medium and transmitting a single mode, and clad 24 having a diameter of about 125 μm, containing glass as a base material and confining laser light generated by excitation.

The refractive indices of first waveguide 21, clad 24 of second waveguide 22, core 23 of second waveguide 22, third waveguide 25 and outer layer 26 are respectively denoted by n1, n2, n3, n4 and n5 are set to satisfy the relation: n5<n1<n4<n2<n3.

On both ends of first waveguide 21, lenses 11a and 11b, and semiconductor lasers 10a and 10b are disposed, respectively, and excitation light is allowed to enter first waveguide 21, respectively. On the other hand, on both ends of core 23, final-stage mirror 12 and output mirror 13 are disposed facing each other. Final-stage mirror 12 feeds back the laser light generated in core 23 and output mirror 13 transmits a part of the laser light.

The operation of laser oscillation apparatus 10 configured as mentioned above is described with reference to FIGS. 1A and 1B. Semiconductor lasers 10a and 10b that are excitation sources emits laser light with the wavelength of 808 nanometers excited from neodymium that is one of the rare earth elements when a power source, a cooling apparatus and a control apparatus (which are not shown) are operated. The excitation light is respectively collected by lenses 11a and 11b that are optical elements in accordance with the predetermined numerical aperture (NA), enters first waveguide 21, which is an excitation light waveguide for transmitting excitation light, from both ends thereof and propagates therein.

When the refractive indices of first waveguide 21 and third waveguide 25 surrounding first waveguide 21 respectively denoted by n1 and n4 satisfy the relation: n1<n4, the excitation light enters third waveguide 25 while it propagates in first waveguide 21. When the refractive indices of outer layer 26 and third waveguide 25 respectively denoted by n5 and n4 satisfy the relation: n5<n4, the excitation light entering third waveguide 25 is confined in third waveguide 25 and propagates in third waveguide 25 while undergoing multiple reflection.

When the refractive indices of clad 24 of second waveguide 22 and third waveguide 25 respectively denoted by n2 and n4 satisfy the relation: n2>n4, a part of the excitation light propagating in third waveguide 25 enters clad 24, is confined in second waveguide 22 and propagates in second waveguide 22 while undergoing multiple reflection.

When the refractive indices of core 23 and clad 24 of second waveguide 22 respectively denoted by n3 and n2 satisfy the relation: n3>n2, a part of the excitation light propagating in the second waveguide enters core 23. Since the cross-sectional shape of clad 24 of second waveguide 22 is a D-letter shape, the excitation light is absorbed by core 23 entirely and excites neodymium, one of the rare earth elements, that is a laser medium while multiple reflection is repeated inside clad 24.

The excitation light entering from both ends of first waveguide 21 propagates in second waveguide 22 while it is attenuated in this absorption process, and then is absorbed by neodymium in core 23 to excite neodymium. Light generated by excitation undergoes multiple amplification feedback and mode selection by final-stage mirror 12 and output mirror 13, which are disposed at both ends of core 23, and core 23 for transmitting a single mode, is converted into a single mode laser light with the wavelength of 1064 nanometers and is emitted from the side of output mirror 13.

Final-stage mirror 12 and output mirror 13 for feeding back laser light may be FBG (Fiber Bragg Grating) capable of selecting the reflectance at the wavelength or Fresnel reflection on fiber end face. Furthermore, a refractive index matching solution containing glycerin as a main component may be employed instead of a refractive index matching material. The excitation light is allowed to enter from both ends of first waveguide 21, but the excitation light may be allowed to enter from one end thereof Light amplifying fiber 20 including one first waveguide was employed but light amplifying fiber 20 including a plurality of first waveguides may be employed.

As mentioned above, by using light amplifying fiber 20 including second waveguide 22 provided with a core for transmitting a single mode and first waveguide 21 for transmitting excitation light so that the excitation light can enter core 23, it is possible to provide a laser oscillation apparatus capable of emitting high output and high beam quality laser light.

Second Exemplary Embodiment

Figure 2A:
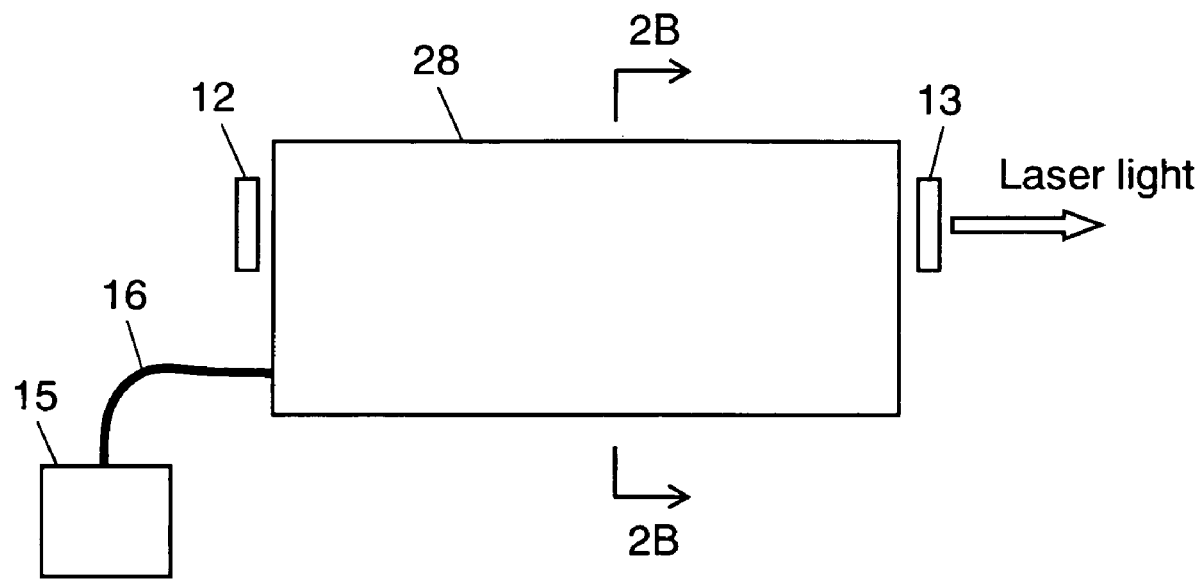
FIG. 2A illustrates a laser oscillation method and a laser oscillation apparatus using a light amplifying fiber in accordance with a second exemplary embodiment of the present invention.
Figure 2B:
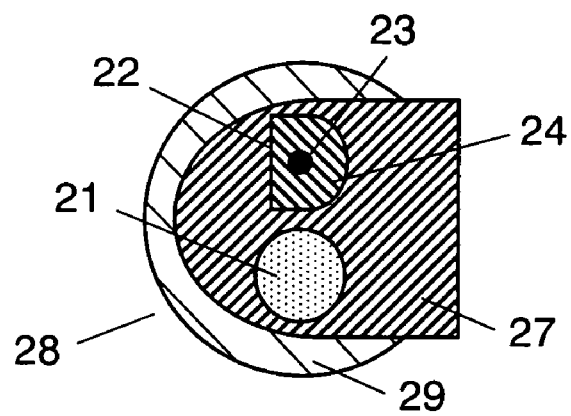
FIG. 2B is a sectional view taken along line 2B-2B of FIG. 2A.

FIG. 2A illustrates a laser oscillation method and a laser oscillation apparatus using a light amplifying fiber in accordance with a second exemplary embodiment of the present invention. FIG. 2B is a sectional view taken along line 2B-2B of FIG. 2A. The same reference numerals are given to the same configuration as in the first exemplary embodiment.

The second exemplary embodiment is different from the first exemplary embodiment in that outer layer 29 of light amplifying fiber 28 has a horseshoe shape and that fluororesin is employed as a material. Furthermore, the second exemplary embodiment is different from the first exemplary embodiment in that one end of semiconductor laser 15 that is an excitation source is connected to one end of fiber 16 and another end of fiber 16 is connected to first waveguide 21 for transmitting excitation light. Furthermore, the second exemplary embodiment is different from the first exemplar embodiment in that the cross-sectional shape of third waveguide 27 is made to be D-letter shape and as the material of the third waveguide 27, ultraviolet curable resin is employed; that a part of third waveguide 27 is protruded from outer layer 29; and in addition, that a curve portion of second waveguide 22 is disposed facing a linear portion of third waveguide 27. With such a configuration, lenses 11a and 11b employed in the first exemplary embodiment (FIGS. 1A and 1B) can be omitted.

The operation of the laser oscillation apparatus configured as mentioned above is described. In FIGS. 2A and 2B, excitation light with the wavelength of 808 nanometers emitted from semiconductor laser 15 provided with a fiber propagates in fiber 16 and enters first waveguide 21. The excitation light propagates in first waveguide 21 and enters third waveguide 27. The refractive index (n4) of third waveguide 27 is selected to be larger than that of outer layer 29 made of fluororesin and the refractive index of the linear portion of third waveguide 27 protruded from outer layer 29 is selected to be larger than that of surrounding medium (for example, the air).

Under such conditions, the excitation light propagates in a state in which it is confined in third waveguide 27. Furthermore, since the cross sectional shape of third waveguide 27 is D-letter shape, most of the excitation light is absorbed by second waveguide 22 to excite neodymium while multiple reflection is repeated in third waveguide 27. Light generated by excitation undergoes multiple amplification feedback and mode selection by final-stage mirror 12 and output mirror 13, which are disposed at both ends of core 23, and core 23 for transmitting a single mode, is converted into a single mode laser light and is emitted from output mirror 13. Note here that in the present invention, the core diameter of the second waveguide generating laser light is selected to have a size for transmitting a single mode. The size is set to be in a range of 6 μm to 20 μm, preferably in a range of 10 μm to 13 μm.

In the second exemplary embodiment, a portion of third waveguide 27 facing the curve portion of second waveguide 22 is made to be a linear portion. However, these shapes may be arbitrarily set and the arrangement in which these are facing may be varied.

A laser oscillation apparatus provided with final-stage mirror 12 and output mirror 13 on both ends of second waveguide 22 was configured. However, a laser amplifying apparatus may be configured in which instead of providing final-stage mirror 12 and output mirror 13, seed light that is a seed of laser amplification is allowed to enter from an end face of second waveguide 22, amplified by excitation and allowed to be emitted from another end of second waveguide 32.

As mentioned above, by using light amplifying fiber 28 including second waveguide 22 having a core for transmitting a single mode and first waveguide 21 for transmitting excitation light so that the excitation light can enter the core, it is possible to provide a laser oscillation apparatus for efficiently emitting high output and high beam quality laser light.

Third Exemplary Embodiment

Figure 3A:
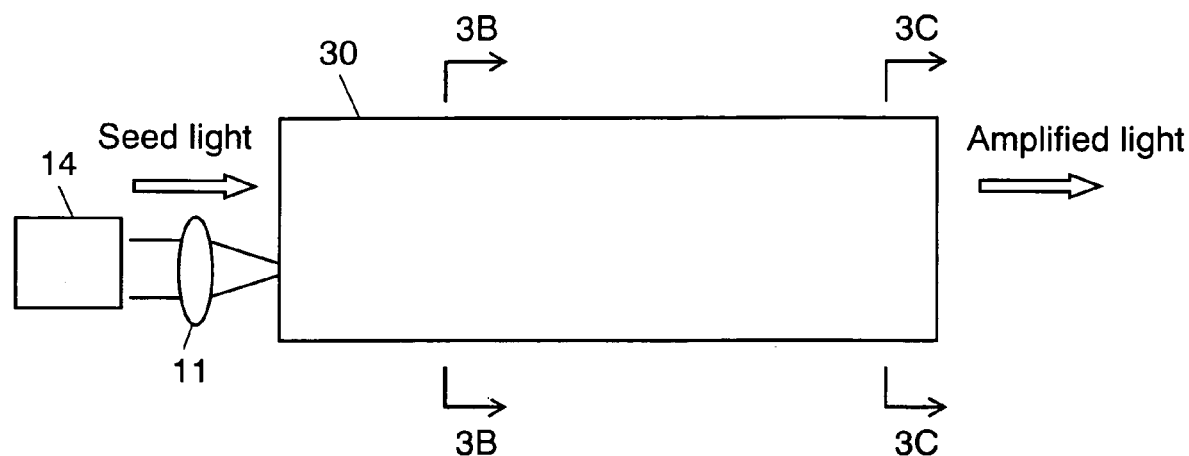
FIG. 3A illustrates a light amplifying method and a laser amplifying apparatus using a light amplifying fiber in accordance with a third exemplary embodiment of the present invention.
Figure 3B:
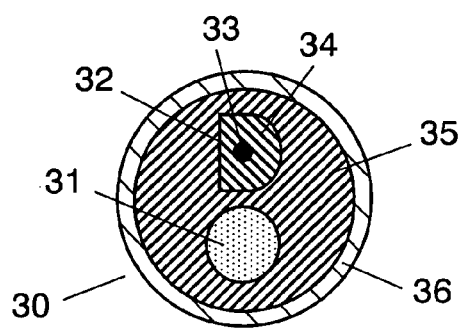
FIG. 3B is a sectional view taken along line 3B-3B of FIG. 3A.
Figure 3C:
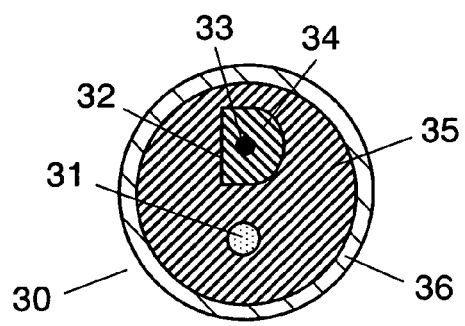
FIG. 3C is a sectional view taken along line 3C-3C of FIG. 3A.

FIG. 3A illustrates a light amplifying method and a laser amplifying apparatus using a light amplifying fiber in accordance with a third exemplary embodiment of the present invention. FIG. 3B is a sectional view taken along line 3B-3B of FIG. 3A. FIG. 3C is a sectional view taken along line 3C-3C of FIG. 3A.

FIGS. 3A, 3B and 3C show semiconductor laser 14 that is an excitation source emitting laser light with the wavelength of 915 nanometers and lens 11 that is an optical element for guiding excitation light to an excitation light waveguide. Furthermore, light amplifying fiber 30 containing a laser medium in a part thereof is provided. Furthermore, FIGS. 3A, 3B and 3C show first waveguide 31 that is an excitation light waveguide, which is made of glass, has a diameter of 125 µm and transmits excitation light. FIGS. 3A, 3B and 3C also show second waveguide 32 having a D-letter shaped cross-section in the direction perpendicular to an optical axis and which absorbs excitation light and generates laser light, third waveguide 35 which confines excitation light and contains a refractive index matching material, and outer layer 36 made of glass and which is filled with a refractive index matching material to enhance the confining efficiency of excitation light.

Furthermore, the cross-sectional shape of first waveguide 31 in the longitudinal direction is substantially circular and has a taper the cross-sectional area of which is gradually decreased along the direction of the optical axis. Second waveguide 32 contains a rare earth element, ytterbium, that is a laser medium inside thereof and includes core 33 having a diameter of 6 µm and transmitting a single mode and clad 34 containing glass as a base material, having a diameter of about 125 µm and confining laser light generated by excitation.

The refractive indices of first waveguide 31, clad 34 of second waveguide 32, core 33 of second waveguide 32, third waveguide 35 and outer layer 36 respectively denoted by n31, n32, n33, n35 and n36 are set to satisfy the relation: $n36<n31<n35<n32<n33$.

The operation of the laser amplifying apparatus configured as mentioned above is described. Semiconductor laser 14 that is an excitation source emits laser light with the wavelength of 915 nanometers that is excitation light of ytterbium by operating a power source, a cooling apparatus and a control apparatus (which are not shown). This excitation light is collected by lens 11 that is an optical element in accordance with a predetermined numerical aperture (NA) and enters first waveguide 31, which is an excitation light waveguide for transmitting excitation light, from both ends thereof and propagates therein.

Since first waveguide 31 has a taper the sectional area of which is gradually decreased in the direction of an optical axis, as compared with a circular shaped waveguide having the same cross-section along a laser optical axis, a larger numerical aperture (NA) can be obtained.

When the refractive indices of first waveguide 31 and third waveguide 35 surrounding first waveguide 31 respectively denoted by n31 and n35 satisfy the relation: $n31<n35$, the excitation light propagates in first waveguide 31 and enters third waveguide 35. At this time, since first waveguide 31 has a gradually decreasing taper shape, the excitation light gradually increases its incident angle to third waveguide 35 as it propagates in first waveguide 31.

Thus, as compared with a circular waveguide having the same cross section along the direction of a laser optical axis, the excitation light enters third waveguide 35 in a shorter distance. When the refractive indices of outer layer 36 and third waveguide 35 respectively denoted by n35 and n36 satisfy the relation: $n36<n35$, the excitation light is confined in third waveguide 35 and propagates in third waveguide 35 while undergoing multiple reflection.

When the refractive indices of clad 34 of second waveguide 32 and third waveguide 35 respectively denoted by n32 and n35 satisfy the relation: $n32>n35$, a part of the excitation light propagating in third waveguide 35 enters clad 34 is confined in second waveguide 32, and propagates in second waveguide 32 while undergoing multiple reflection.

When the refractive indices of core 33 and clad 34 of second waveguide 32 respectively denoted by n33 and n32 satisfy the relation: $n33>n32$, a part of the excitation light propagating in second waveguide 32 enters core 33. At this time, while multiple reflection is repeated inside clad 34 of second waveguide 32, all the excitation light is absorbed by core 33 to excite ytterbium that is a laser medium.

The excitation light entering first waveguide 31 propagates in second waveguide 32 while it is attenuated in this absorption process, then is absorbed by ytterbium in core 33 to excite ytterbium. On the other hand, seed light that is a seed of laser amplification enters second waveguide 32 from one end face thereof. The entering seed light is amplified by excitation and emitted from another end of second waveguide 32.

Note here that in the third exemplary embodiment, the cross-sectional shape of second waveguide 32 is made to be D-letter shape, but may be rectangular. Furthermore, similar to the first exemplary embodiment, a refractive index matching solution other than the refractive index matching material may be employed.

As mentioned above, by employing light amplifying fiber 30 including second waveguide 32 having a core for transmitting a single mode and first waveguide 31 having a taper the cross-section of which is gradually decreased along the direction of an optical axis and transmitting excitation light so that the excitation light can enter the core, it is possible to provide a laser amplification apparatus capable of emitting high output and high beam quality laser light.

Fourth Exemplary Embodiment

Figure 4A:
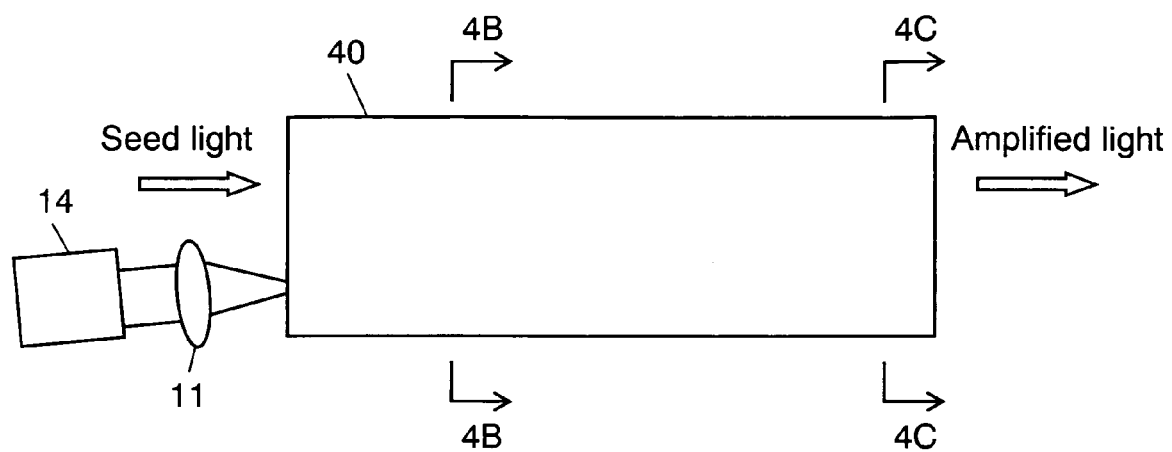
FIG. 4A illustrates a light amplifying method and a laser amplifying apparatus using a light amplifying fiber in accordance with a fourth exemplary embodiment of the present invention.
Figure 4B:
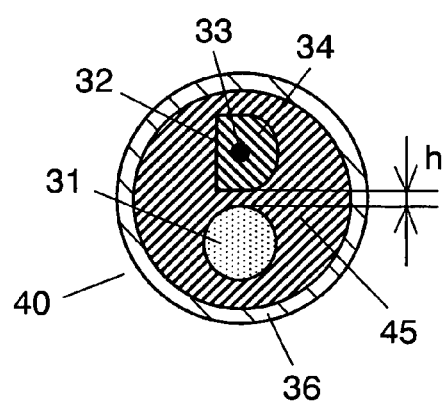
FIG. 4B is a sectional view taken along line 4B-4B of FIG. 4A.
Figure 4C:
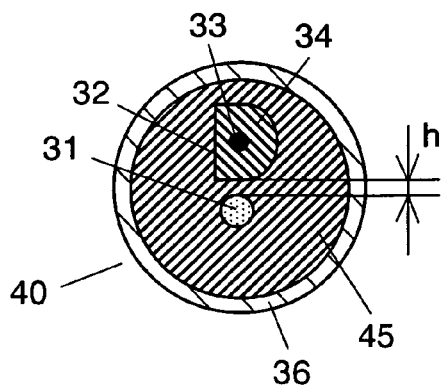
FIG. 4C is a sectional view taken along line 4C-4C of FIG. 4A.

FIG. 4A illustrates a light amplifying method and a laser amplifying apparatus using a light amplifying fiber in accordance with a fourth exemplary embodiment of the present invention. FIG. 4B is a sectional view taken along line 4B-4B of FIG. 4A. FIG. 4C is a sectional view taken along line 4C-4C of FIG. 4A. In the fourth embodiment, the same reference numerals are given to the same configuration as in the third exemplary embodiment.

The fourth exemplary embodiment is different from the third exemplary embodiment in that first waveguide 31 is tilted in the direction of a laser optical axis and that the shape of third waveguide 45 is changed accordingly. Furthermore, the fourth exemplary embodiment is different from the third exemplary embodiment in that semiconductor laser 14 and lens 11 are tilted along the direction of the laser optical axis so that excitation light enters from the front surface of first waveguide 31.

In FIGS. 4A and 4B, first waveguide 31 is disposed tilting in the direction of a laser optical axis so that the minimal distance h between first waveguide 31 and second waveguide 32 is constant in the direction of the laser optical axis in light amplifying fiber 40. That is to say, first waveguide 31 has a taper the cross-section of which is gradually decreased in the direction of an optical axis. Furthermore, semiconductor laser 14 and lens 11 are tilted in the direction of the laser optical axis so that excitation light enters from the front surface of first waveguide 31.

The operation of the laser oscillation apparatus configured as mentioned above is described. The excitation light emitted from semiconductor laser 14 that is an excitation source propagates in first waveguide 31 and enters third waveguide 45. At this time, since a cross-sectional area of first waveguide 31 has a taper shape gradually decreasing in the direction of an optical axis and the minimal distance h between first waveguide 31 and second waveguide 32 is kept constant, even if the excitation light propagates in first waveguide 31, the energy is not attenuated and can be efficiently confined in second waveguide 32 so as to excite ytterbium. On the other hand, a seed light that is a seed of laser amplification enters second waveguide 32 from one end face thereof. The entering seed light is amplified by excitation as mentioned above and is emitted from another end of second waveguide 32.

Note here that a surrounding medium that is brought into contact with outer layer 36 is the air. However, on the outer circumference of outer layer 36, for example, a resin layer having a refractive index smaller than refractive index n36 may be provided.

As mentioned above, by employing a fiber including a waveguide provided with a core for transmitting a single mode and a gradually decreased taper shaped waveguide for transmitting excitation light so that the excitation light can enter the core, it is possible to provide a laser amplifying apparatus for emitting high output and high beam quality laser light.

Fifth Exemplary Embodiment

Figure 5:
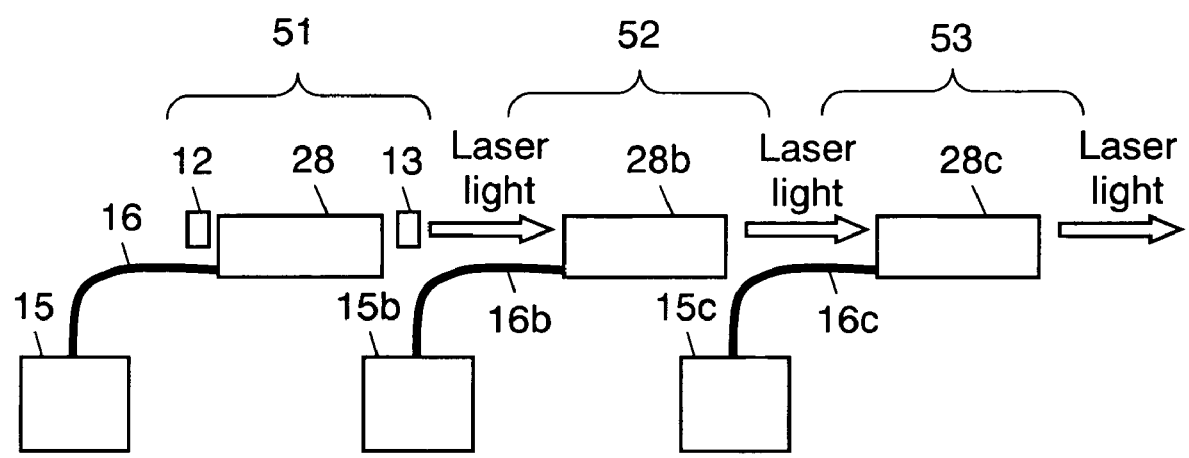
FIG. 5 illustrates a laser oscillation method, a light amplifying method and a laser apparatus using a light amplifying fiber in accordance with a fifth exemplary embodiment of the present invention.

FIG. 5 illustrates a laser oscillation method, a light amplifying method and a laser apparatus using a light amplifying fiber in accordance with a fifth exemplary embodiment of the present invention. This exemplary embodiment is characterized in that laser oscillation apparatus 51, laser amplifying apparatus 52 and laser amplifying apparatus 53 are connected in series to form a multi-stage configuration. Laser oscillation apparatus 51 is provided with final-stage mirror 12 and output mirror 13. However, laser amplifying apparatuses 52 and 53 are not provided with these mirrors.

The operation of the laser oscillation apparatus configured as mentioned above is described. Excitation light with the wavelength of 808 nanometers emitted from semiconductor laser 15 that is an excitation source is induced to fiber 16 and enters light amplifying fiber 28. Thereafter, the laser oscillation apparatus together with final-stage mirror 12 and output mirror 13, which are feedback means, emit laser light with the wavelength of 1064 nanometers. Furthermore, this laser light enters the second waveguide (not shown) of next-stage light amplifying fiber 28. This entering laser light is amplified by semiconductor laser 15b and enters a second waveguide (not shown) of next-stage light amplifying fiber 28c. This entering laser light is amplified by semiconductor laser 15c and emitted.

Note here that a method for allowing laser light emitted from laser oscillation apparatus 51 to enter the second waveguide of light amplifying fiber 28b of laser amplifying apparatus 52 in the next stage and a method for allowing the laser light to enter the second waveguide of light amplifying fiber 28c of laser amplifying apparatus 53 in the further next stage may employ space transmission using a lens or fiber transmission. At this time, one end of fiber 16b is connected to laser oscillation apparatus 51 and another end to laser amplifying apparatus 52, respectively. Desirably, they are connected by fusion. It is desirable because the connection reliability is further enhanced. Furthermore, one end of fiber 16c may be connected to laser amplifying apparatus 52 and another end may be connected to laser amplifying apparatus 53.

Laser oscillation apparatus based on a second waveguide including laser oscillation apparatus 51 and laser amplifying apparatuses 52 and 53 may be configured. Note here that by mounting the laser apparatus of the fifth exemplary embodiment on a laser processing apparatus to collect emitted light, laser processing such as welding or cutting can be carried out and a laser processing apparatus can be provided, and thus can be used for various kinds of facilities.

As mentioned above, by configuring a second waveguide having a core for transmitting a single mode and a first waveguide for transmitting excitation light so that excitation light can enter the core, and by connecting laser oscillation apparatus 51 using fibers 16, 16b and 16c and laser amplifying apparatuses 52 and 53 in series, it is possible to provide a laser apparatus capable of emitting high output and high beam quality laser light.

Sixth Exemplary Embodiment

Figure 6A:
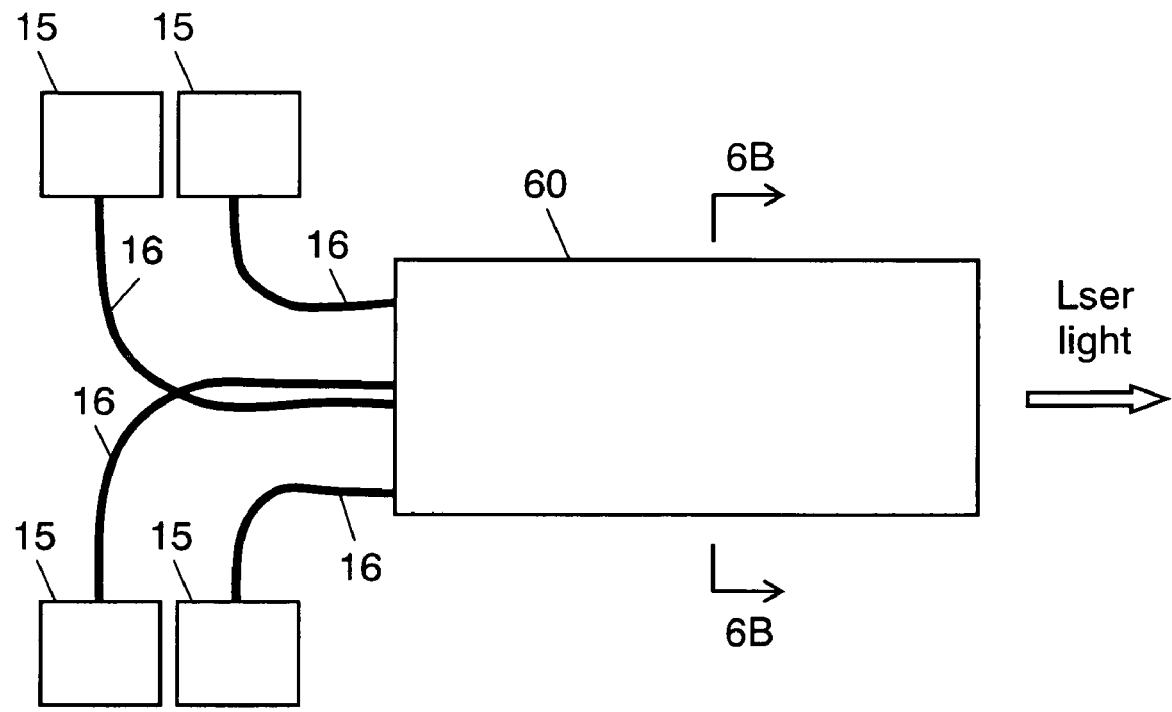
FIG. 6A illustrates a laser oscillation method and a laser apparatus using a light amplifying fiber in accordance with a sixth exemplary embodiment of the present invention.
Figure 6B:
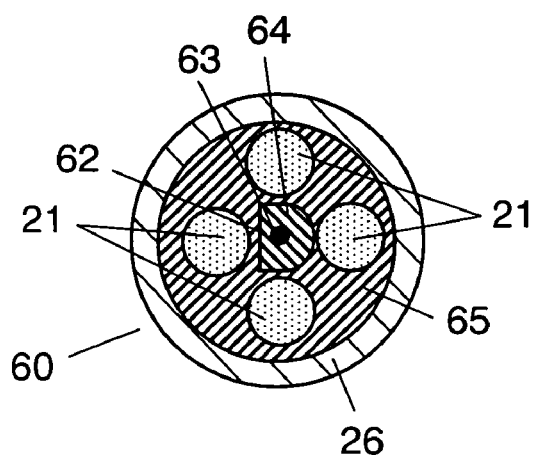
FIG. 6B is a sectional view taken along line 6B-6B of FIG. 6A.

FIG. 6A illustrates a laser oscillation method and a laser apparatus using a light amplifying fiber in accordance with a sixth exemplary embodiment of the present invention. FIG. 6B is a sectional view taken along line 6B-6B of FIG. 6A. The sixth exemplary embodiment is different from the first and second exemplary embodiments in that light amplifying fiber 60 includes four first waveguides 21 for transmitting excitation light and they are configured so as to surround second waveguide 62 and that at one end of core 63 containing neodymium that is a laser medium for generating laser light, FBG (Fiber Bragg Grating) reflecting the laser light is provided and at another end of core 63, FBG (Fiber Bragg Grating) transmitting a part of the laser light is provided.

The operation of the laser oscillation apparatus configured as mentioned above is described. Excitation light emitted from semiconductor laser 15 having fibers propagates in fiber 16 and enters first waveguide 21. The excitation light propagates in first waveguide 21 and then enters third waveguide 65. The entering light is absorbed by second waveguide 62 to excite neodymium while the entering light repeats multiple reflection inside third waveguide 65. Light generated by excitation undergoes multiple amplification feedback and mode selection by the FBGs provided at both ends of core 63 and core 63 for transmitting a single mode, is converted into a single mode laser light and the single mode laser light is emitted from the end face of light amplifying fiber 60.

Note here that the shapes and refractive indices of four first waveguide 21 are made to be the same but they may be different from each other. In any case, the refractive indices n1 of four first waveguide 21 are set to be smaller than the refractive index n4 of third waveguide 65. Note here that four first waveguides 21 need not be disposed at equal distance with respect to core 63.

As mentioned above, by employing light amplifying fiber 60 including second waveguide 62 provided with core 63 for transmitting a single mode and a plurality of first waveguides 21 for transmitting excitation light so that excitation light can enter core 63 simultaneously, it is possible to provide a laser oscillation apparatus capable of efficiently emitting high output and high beam quality laser light.

Seventh Exemplary Embodiment

Figure 7A:
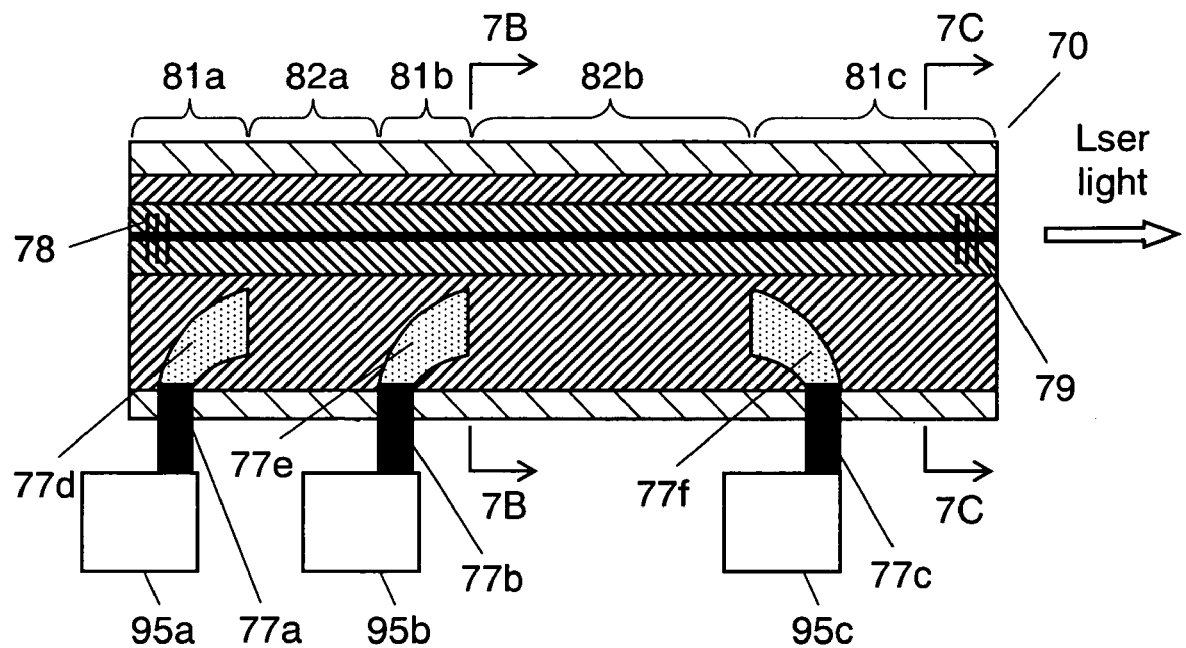
FIG. 7A illustrates a laser oscillation method and a laser oscillation apparatus using a light amplifying fiber in accordance with a seventh exemplary embodiment of the present invention.
Figure 7B:
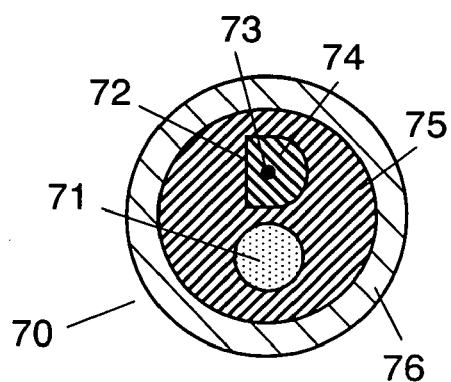
FIG. 7B is a sectional view taken along line 7B-7B of FIG. 7A.
Figure 7C:
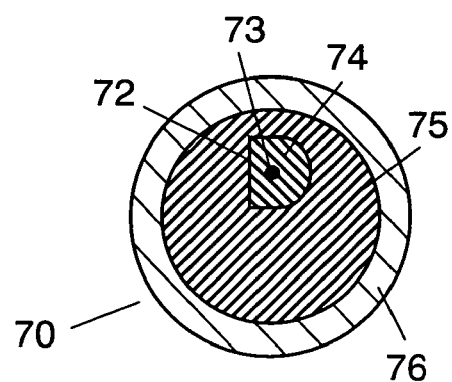
FIG. 7C is a sectional view taken along line 7C-7C of FIG. 7A.
Figure 8A:
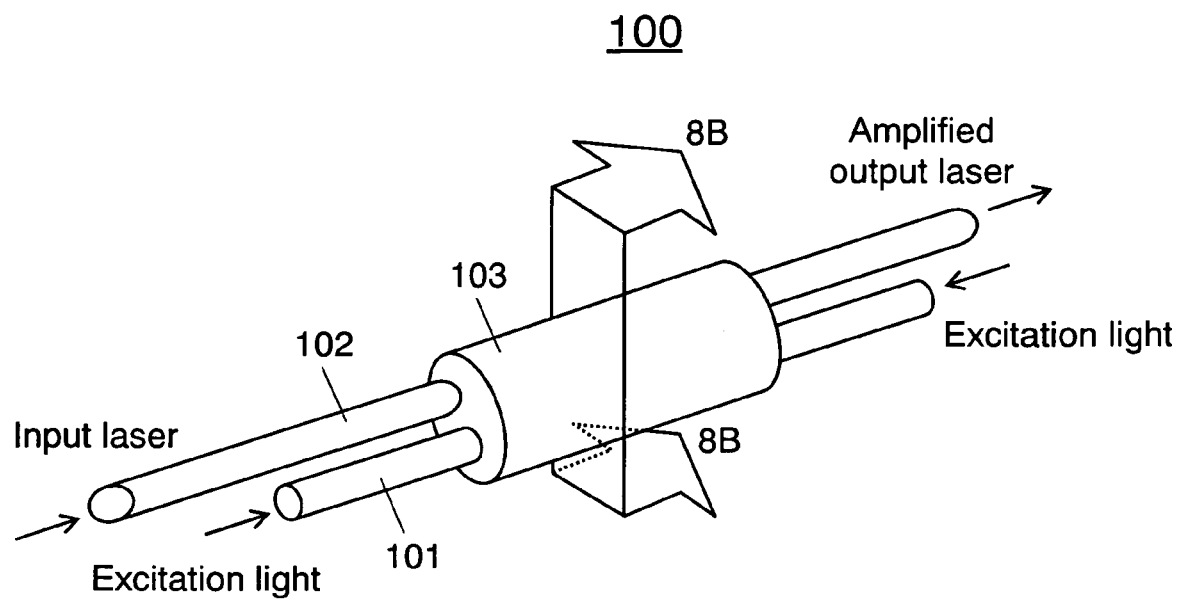
FIG. 8A illustrates a conventional laser apparatus.
Figure 8B:
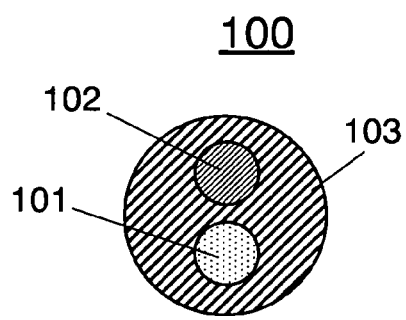
FIG. 8B is a sectional view taken along line 8B-8B of FIG. 8A.

FIG. 7A illustrates a laser oscillation method and a laser oscillation apparatus using a light amplifying fiber in accordance with a seventh exemplary embodiment of the present invention. FIG. 7B is a sectional view taken along line 7B-7B of FIG. 7A. FIG. 7C is a sectional view taken along line 7C-7C of FIG. 7A.

FIGS. 7A, 7B and 7C show semiconductor lasers 95a, 95b and 95c that are excitation sources of excitation light with the wavelength of 808 nanometers. Furthermore, FIGS. 7A, 7B and 7C show excitation light transmitting fibers 77a, 77b and 77c for transmitting excitation light and further show excitation light transmitting fiber cores 77d, 77e and 77f.

Furthermore, light amplifying fiber 70 includes neodymium that is a laser medium in a part thereof. In the longitudinal direction of light amplifying fiber 70, idle regions 81a, 81b and 81c for transmitting excitation light are formed and filling regions 82a and 82b for filling excitation light in the waveguide having a laser medium are formed.

Idle regions 81a, 81b and 81c are excitation light waveguides for transmitting excitation light. These excitation light waveguides include first waveguide 71 made of quartz glass and provided with excitation light transmitting fiber core 73 second waveguide 72 containing glass as a base material and absorbing excitation light to generate laser light, third waveguide 75 made of ultraviolet curable resin and confining excitation light, and outer layer 76 made of glass and disposed surrounding third waveguide 75 for enhancing the confining efficiency of excitation light.

Filling regions 82a and 82b include second waveguide 72 for absorbing excitation light and generating laser light, third waveguide 75 for confining excitation light and outer layer 76 for enhancing the confining efficiency of third waveguide 75.

Furthermore, second waveguide 72 includes core 73 containing a rare earth element, neodymium, that is a laser medium and transmitting a single mode and clad 74 containing glass as a base material and confining laser light.

The refractive indices of first waveguide 71, clad 74 of second waveguide 72 and core 73 of second waveguide 72 and waveguide 75 respectively denoted by n71, n72, n73, n74 and n75 are set to satisfy the relation: $n75<n71<n74<n72<n73$.

Meanwhile, both ends of core 73 are provided with high reflecting FBG 78 for feeding back laser light generated in core 73 and transmission FBG 79 transmitting a part of laser light.

Excitation light transmitting fibers 77a, 77b and 77c penetrate outer layer 76 and excitation light transmitting fiber cores 77d, 77e and 77f are connected to third waveguide 75.

Excitation light transmitting fibers 77d, 77e and 77f are disposed at predetermined intervals. Among them, excitation light transmitting fiber core 77e and excitation light transmitting fiber core 77f are disposed opposing to each other.

The operation of the laser oscillation apparatus configured as mentioned above is described. Laser light with the wavelength of 808 nanometers emitted from semiconductor laser 95a is transmitted through excitation light transmitting fiber core 77a and excitation light transmitting fiber core 77d and enters third waveguide 75 in idle region 81a of light amplifying fiber 70.

The excitation light entering third waveguide 75 enters filling region 82a of light amplifying fiber 70. Since the refractive indices of outer layer 76 and third waveguide 75 respectively denoted by n76 and n75 satisfy the relation: $n76<n75$, the excitation light is confined in third waveguide 75 and propagates in third waveguide 75 while undergoing multiple reflection.

Since the refractive indices of clad 74 of second waveguide 72 and third waveguide 75 respectively denoted by n72 and n75 satisfy the relation: $n72>n75$, a part of the excitation light propagating in third waveguide 75 enters clad 74, is confined in second waveguide 72 and propagates in second waveguide 72 while undergoing multiple reflection.

Since the refractive indices of core 73, and clad 74 of second waveguide 72 respectively denoted by n73 and n72 satisfy the relation: $n73>n72$, a part of the excitation light propagating in second waveguide 72 enters core 73.

That is to say, all the excitation light is present in third waveguide 75 in idle region 81a, and present in third waveguide 75 and second waveguide 72 in filling region 82b.

Similarly, laser light with the wavelength of 915 nanometers emitted from semiconductor laser 95b is transmitted through excitation light transmitting fiber core 77b and excitation light transmitting fiber core 77e and enters third waveguide 75 in idle region 81b of light amplifying fiber 70.

Excitation light entering third waveguide 75 enters filling region 82b of light amplifying fiber 70. Since the refractive indices of outer layer 76 and clad 74 of second waveguide 72 respectively denoted by n76 and n72 satisfy the relation: $n76<n72$, a part of the excitation light is confined in third waveguide 75 and propagates in third waveguide 75 while undergoing multiple reflection. This means that an idle region in which excitation light entering third waveguide 75 propagates and moves to 2nd waveguide 72 and no excitation light is present in third waveguide 75 is provided.

Since the refractive indices of clad 74 of second waveguide 72 and third waveguide 75 respectively denoted by n72 and n75 satisfy the relation: $n72>n75$, a part of the excitation light propagating in third waveguide 75 enters clad 74, is confined in second waveguide 72 and propagates in second waveguide 72 while undergoing multiple reflection.

Since the refractive indices of core 73 and clad 74 of second waveguide 72 respectively denoted by n73 and n72 satisfy the relation: $n73>n72$, a part of the excitation light propagating in the second waveguide 72 enters core 73.

That is to say, all the excitation light is present in third waveguide 75 in idle region 81b, and present in third waveguide 75 and second waveguide 72 in filling region 82b.

Furthermore, laser light with the wavelength of 808 nanometers emitted from semiconductor laser 95c is transmitted through excitation light transmitting fiber core 77c and excitation light transmitting fiber core 77f and enters third waveguide 75 in idle region 81c of light amplifying fiber 70.

Excitation light entering third waveguide 75 enters filling region 82b of light amplifying fiber 70. Since the refractive indices of outer layer 76 and third waveguide 75 respectively denoted by n76 and n75 satisfy the relation: $n76<n75$, the excitation light is confined in third waveguide 75 and propagates in third waveguide 75 while undergoing multiple reflection.

Since the refractive indices of second waveguide 72 and third waveguide 75 respectively denoted by n72 and n75 satisfy the relation: $n72>n75$, a part of the excitation light propagating in the third waveguide 75 enters clad 74, is confined in second waveguide 72 and propagates in waveguide 72 while undergoing multiple reflection.

Since the refractive indices of core 73 and clad 74 of second waveguide 72 respectively denoted by n73 and n72 satisfy the relation: $n73>n72$, a part of the excitation light propagating in second waveguide 72 enters core 73.

That is to say, all the excitation light is present in third waveguide 75 in idle region 81c, and present in third waveguide 75 and second waveguide 72 in filling region 82b.

As mentioned above, each excitation light emitted from semiconductor lasers 95a, 95b and 95c enters core 73 and excites ytterbium added to core 73. Light generated by excitation undergoes multiple amplification feedback and mode selection by high reflecting FBG 78 for feeding back laser light and transmission FBG 79 transmitting a part of laser light, which are disposed at both ends of core 73, and core 73 for transmitting a single mode, and is converted into a single mode laser light with the wavelength of 1064 nanometers and the single mode laser light is emitted from light amplifying fiber 70.

Note here that laser light is emitted from one end of light amplifying fiber 70. However, by allowing high-reflection FBG 78 to be partially transmission type, laser light may be emitted from both ends and an output from one of the ends may be used as a monitor for output and wavelength.

Furthermore, in the seventh exemplary embodiment, FBG is provided on the end portion of the light amplifying fiber. However, FBG may be provided in a filling region and the filling region may be divided into three regions, that is, a filing region, an idle region and a filling region. Laser apparatus may include laser oscillation region including a pair of high reflecting FBG and transmission FBG and other laser amplification region.

As mentioned above, by configuring light amplifying fiber 70 including second waveguide 72 provided with a core for transmitting a single mode and first waveguide 71 for transmitting excitation light so that idle region and filling region are provided and excitation light can enter the core, it is possible to provide a laser oscillation apparatus capable of emitting high output and high beam quality laser light.

INDUSTRIAL APPLICABILITY

A light amplifying fiber, and a light amplifying method, a laser oscillation method, a laser amplifying apparatus and a laser oscillation apparatus using the light amplifying fiber, as well as a laser apparatus and a laser processing machine using the laser oscillation apparatus according to the present invention have a high industrial applicability as a laser apparatus, and the like, for emitting high output and high beam quality laser light.

The invention claimed is:

1. A light amplifying fiber comprising:
a first waveguide for transmitting excitation light;
a second waveguide including a core containing a laser medium for generating laser light and a clad for transmitting the excitation light, wherein the core is surrounded by the clad, and the second waveguide is different from the first wave guide; and
a third waveguide surrounding the first waveguide and the second waveguide,
wherein refractive indices of the first waveguide, the clad of the second waveguide, the core of the second waveguide and the third waveguide are respectively denoted by n1, n2, n3 and n4 satisfy a relation: n1<n4<n2<n3.

2. The light amplifying fiber according to claim 1, wherein the first waveguide has a shape in which a sectional area of a surface perpendicular to a longitudinal direction of the first waveguide is gradually decreased in the longitudinal direction.

3. The light amplifying fiber according to claim 2, wherein an interval between the first waveguide and the second waveguide is constant in the longitudinal direction of the first waveguide.

4. The light amplifying fiber according to claim 1, wherein an outer circumference of the third wave guide is provided with an outer layer for confining excitation light in the third waveguide, and refractive indices of the outer layer and the third waveguide respectively denoted by n5 and n4 satisfy a relation: n5<n4.

5. The light amplifying fiber according to claim 4, wherein the outer layer is formed of glass.

6. The light amplifying fiber according to claim 4, wherein the outer layer is formed of fluororesin.

7. The light amplifying fiber according to claim 1, comprising a plurality of the first waveguides.

8. The light amplifying fiber according to claim 1, wherein the third waveguide is formed of ultraviolet curable resin.

9. The light amplifying fiber according to claim 1, wherein the third wave guide comprises a refractive index matching material or a refractive index matching solution.

10. The light amplifying fiber according to claim 1, wherein at least a part of a cross-sectional shape of the second waveguide and the third waveguide has a linear shape.

11. The light amplifying fiber according to claim 1, wherein a diameter of the core corresponds to a size for transmitting a single mode.

12. The light amplifying fiber according to claim 1, wherein the laser medium is composed of an rare earth element.

13. The light amplifying fiber according to claim 1, wherein the light amplifying fiber has a feedback means for feeding back light emitted from the light amplifying fiber.

14. The light amplifying fiber according to claim 13, wherein the feedback means is a FBG (Fiber Bragg Grating).

15. A light amplifying method using an excitation source for emitting excitation light and a light amplifying fiber according to any one of claims 1, 4, 5, or 9-12, wherein the excitation light is allowed to enter the first waveguide of the light amplifying fiber.

16. An laser oscillation method using an excitation source for emitting excitation light, a light amplifying fiber according to any one of claims 1, 4, 5, or 9-12, and a means for feeding back light generated in the light amplifying fiber, wherein the excitation light is allowed to enter the first waveguide of the light amplifying fiber so as to oscillate laser light.

17. A laser amplifying apparatus comprising an excitation source for emitting excitation light and a light amplifying fiber according to any one of claims 1, 4, 5, or 9-12, wherein the excitation light is allowed to enter the first waveguide of the light amplifying fiber.

18. A laser oscillation apparatus comprising an excitation source for emitting excitation light, a light amplifying fiber according to any one of claims 1, 4, 5, or 9-12, and a means for feeding back light generated in the light amplifying fiber, wherein the excitation light is allowed to enter the first waveguide of the light amplifying fiber so as to oscillate the laser light.

19. A laser apparatus comprising:
a) a laser oscillation apparatus comprising:
an excitation source for emitting excitation light; and
a light amplifying fiber comprising:
first waveguide for transmitting the excitation light;

a second waveguide including a core containing a laser medium for generating laser light and a clad for transmitting the excitation light, wherein the core is surrounded by the clad, and the second waveguide is different from the first wave guide; and a third waveguide surrounding the first waveguide and the second waveguide;

wherein refractive indices of the first waveguide, the clad of the second waveguide, the core of the second waveguide and the third waveguide are respectively denoted by n1, n2, n3 and n4 satisfy a relation: n1<n4<n2<n3; and b) a laser amplifying apparatus comprising:

another excitation source for emitting another excitation light; and another light amplifying fiber comprising:

another first waveguide for transmitting the another excitation light;

another second waveguide including another core containing a laser medium for generating laser light and another clad for transmitting the another excitation light, wherein the another core is surrounded by the another clad, and the another second waveguide is different from the another first wave guide; and another third waveguide surrounding the another first waveguide and the another second waveguide; and c) a means for guiding light emitted from the laser oscillation apparatus to the laser amplifying apparatus.

20. The laser apparatus according to claim 19, wherein the excitation source is a semiconductor laser.

21. The laser apparatus according to any one of claims 19 and 20, wherein the excitation light of the semiconductor laser is transmitted by a fiber and the fiber is connected to a first waveguide.

22. A laser processing machine using a laser apparatus according to any one of claims 19 and 20.

23. A laser processing machine using a laser apparatus according to claim 19, wherein an outer circumference of the third wave guide is provided with an outer layer for confining excitation light in the third waveguide, and refractive indices of the outer layer and the third waveguide respectively denoted by n5 and n4 satisfy a relation: n5<n4 and an outer circumference of the another third waveguide is provided with another outer layer for confining excitation light in the another third wave guide, and refractive indices of the outer layer and the another third waveguide respectively denoted by n5 and n4 satisfy a relation: n5<n4.

24. A laser processing machine using a laser apparatus according to claim 23, wherein the outer layer and the another outer layer are formed of glass and the another.

25. A laser processing machine using a laser apparatus according to claim 19, wherein the third waveguide and the another third waveguide respectively comprise a refractive index matching material or a refractive index matching solution.

26. A laser processing machine using a laser apparatus according to claim 19, wherein at least a part of a cross-sectional shape of the second waveguide and the third waveguide has a linear shape, and at least a part of a cross-sectional shape of the another second waveguide and the another third waveguide has a linear shape.

27. A laser processing machine using a laser apparatus according to claim 19, wherein each of diameters of the core and the another core corresponds a size for transmitting a single mode.

28. A laser processing machine using a laser apparatus according to claim 19, wherein the laser medium is composed of a rare earth element.

29. A laser processing machine using a laser apparatus according to any one of claims 23 and 28.

* * * * *